United States Patent
Ebisawa et al.

(10) Patent No.: US 6,814,329 B2
(45) Date of Patent: Nov. 9, 2004

(54) PRODUCTION MANAGING METHOD FOR PHOTO FILM PRODUCTION

(75) Inventors: Ryoji Ebisawa, Kanagawa (JP); Hiroshi Seikai, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/208,776

(22) Filed: Aug. 1, 2002

(65) Prior Publication Data

US 2003/0025027 A1 Feb. 6, 2003

(30) Foreign Application Priority Data

Aug. 2, 2001 (JP) ........................................ 2001-234572

(51) Int. Cl.[7] .......................... B65H 18/10; B65H 26/06
(52) U.S. Cl. .................... 242/523; 242/524; 242/525.4; 242/534; 242/534.2; 242/530.4; 242/912
(58) Field of Search .............................. 242/523, 523.1, 242/524, 524.1, 525.4, 534, 534.2, 538.4, 912, 530.4

(56) References Cited

U.S. PATENT DOCUMENTS

| | | | | |
|---|---|---|---|---|
| 5,768,153 A | * | 6/1998 | Hosono et al. ............. | 364/552 |
| 5,896,293 A | * | 4/1999 | Teramoto et al. ......... | 364/468.18 |
| 6,155,025 A | * | 12/2000 | Komiya et al. ............. | 53/147 |
| 6,205,060 B1 | * | 3/2001 | Sanda et al. ............ | 365/189.04 |
| 6,367,727 B1 | * | 4/2002 | Sasou et al. ............. | 242/532.6 |

* cited by examiner

Primary Examiner—John M. Jillions
(74) Attorney, Agent, or Firm—Sughrue Mion, PLLC

(57) ABSTRACT

A production managing method for production of motion picture photo film is provided. At first, film web is slitted to produce continuous photo film having a predetermined width. Production managing information is written to an RFID (radio frequency identification) tag, and includes a roll number and slitting number, which are related to the film web and the continuous photo film. The continuous photo film is cut to produce motion picture photo film. The production managing information is stored in association with the motion picture photo film. The motion picture photo film is checked. If the motion picture photo film has a defect, the production managing information may be referred to for detecting a portion of the film web or the continuous photo film from which the defect derives. Other motion picture photo films with a defect will be traced.

18 Claims, 16 Drawing Sheets

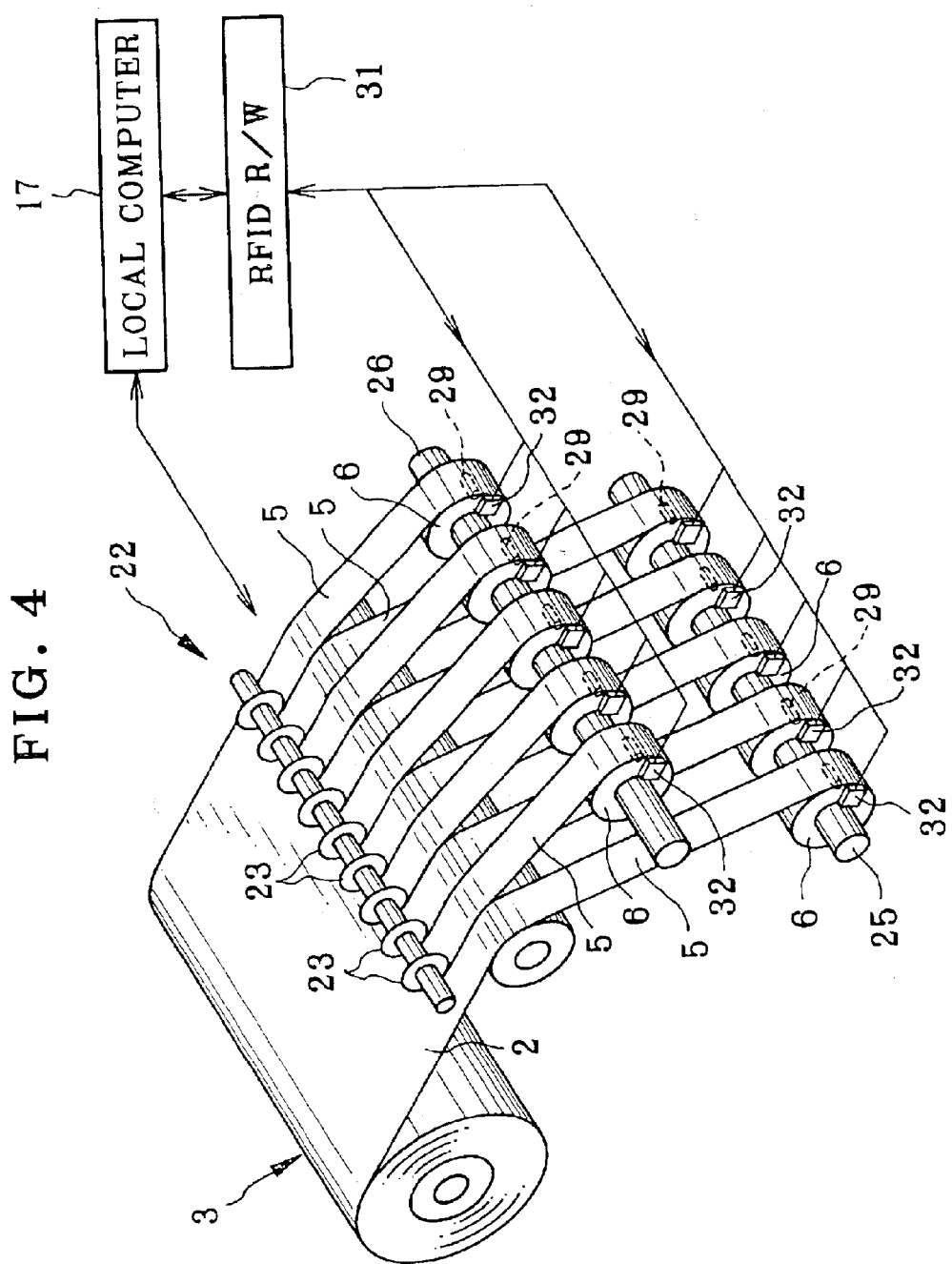

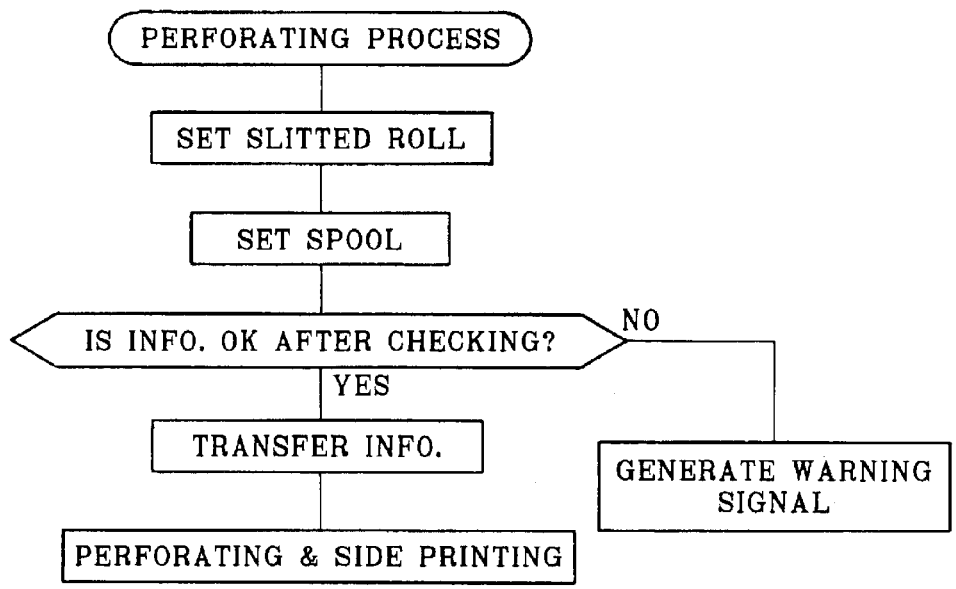
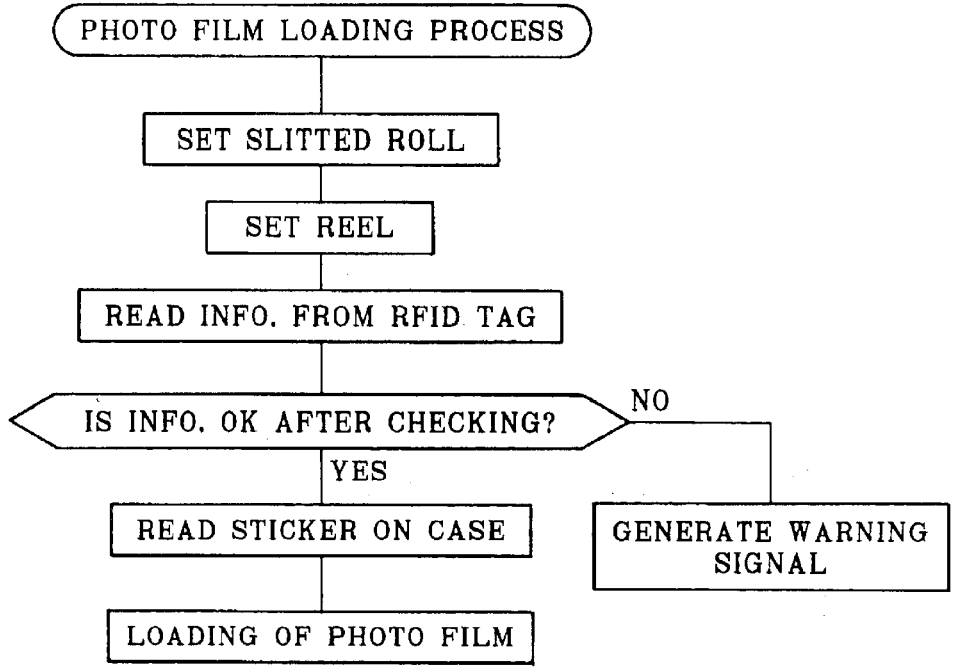

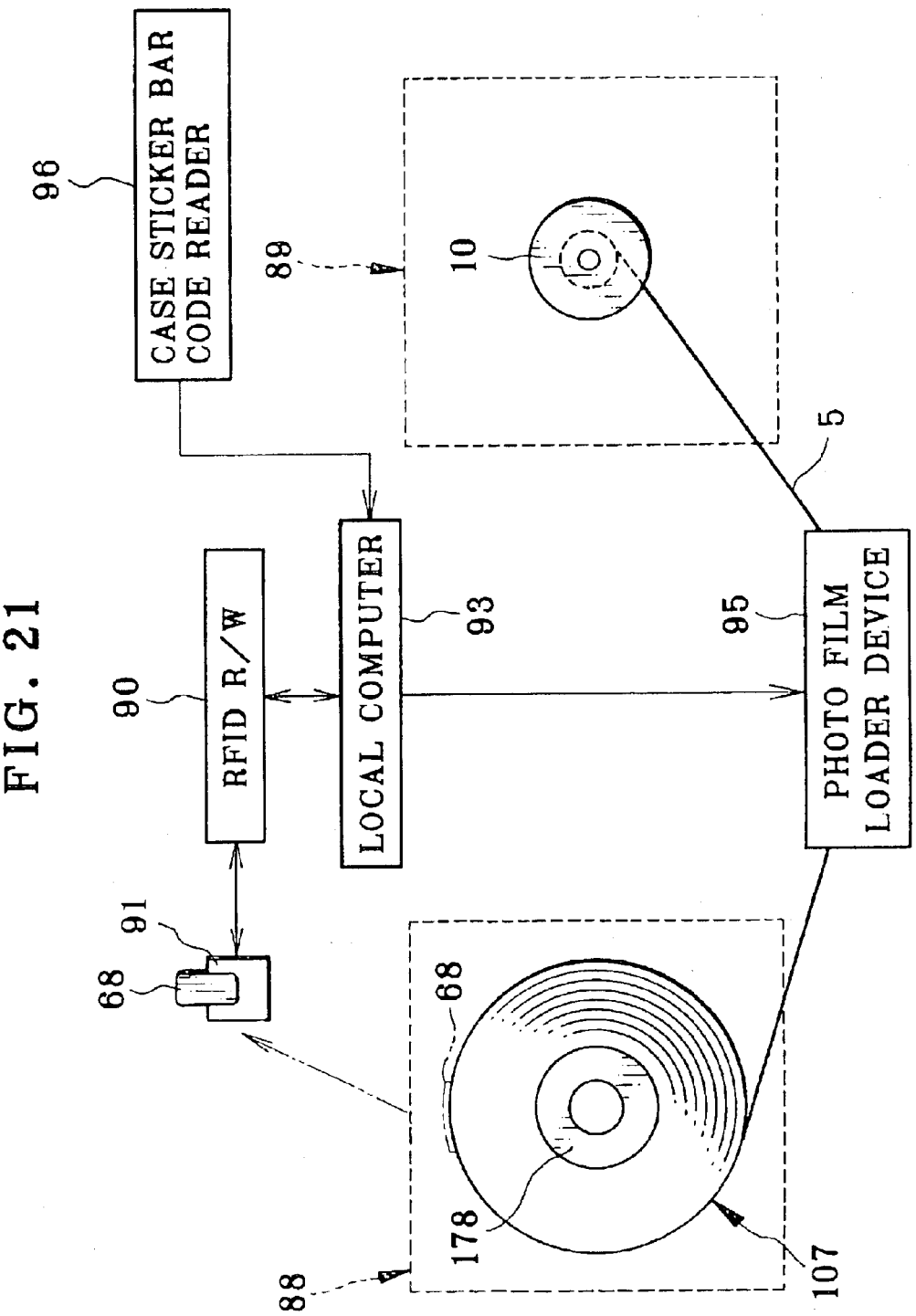

PRODUCTION MANAGING METHOD FOR PHOTO FILM PRODUCTION

BACKGROUND OF THE INVENTION

1. Field of the Invention

The present invention relates to a production managing method for photo film production. More particularly, the present invention relates to a production managing method for photo film production in which continuous photo films are handled from one stage to another among plural stages of manufacturing processes, and each one of continuous photo films can be identified reliably without errors.

2. Description Related to the Prior Art

A motion picture photo film is a product having a regular width and having a considerable length. To manufacture this, film web with a great width is prepared. The film web includes a support of plastic film and emulsion layers overlaid thereon, and is wound in a roll form as a master roll. The master roll is supplied into a dark room, and slitted into continuous photo film or slitted film at the width of the product in a stage for a slitting process. The continuous photo film is wound about a spool to form a slitted roll. A stage for a perforating process is supplied with the slitted roll. Perforations are formed in lateral edge portions of the continuous photo film. The continuous photo film with perforations is transferred to a stage for a photo film loading process, cut at a regular great length, and wound about a reel to obtain a roll of the motion picture photo film.

To transfer the slitted roll from the slitting stage to a stage for next process, a light-tight case is used for individually containing each one of the slitted roll. An identification number of the slitted roll is printed on the light-tight case, and will be used for determining the slitted roll in stages for succeeding processes which are the perforating process and photo film loading process.

Also, it is possible to use a transferring vehicle, which has a light-tight container portion for containing a plurality of the slitted rolls, and transfers the slitted roll from the slitting stage to next stage. To identify the slitted roll, identification information is constituted by a vehicle number assigned to the transferring vehicle, and information of a position of the slitted roll inside the transferring vehicle.

However, there arises a problem in that management of handling of the slitted roll is complicated because the slitted roll must be individually handled in a state contained in the light-tight case. Also, errors are likely to occur in the position of the slitted roll inside the transferring vehicle, and cause a serious problem in that the position inside the transferring vehicle cannot be used as identification information of the slitted roll.

Furthermore, operators for a manufacturing line of the motion picture photo film handle the slitted roll in the dark room. They manually load various devices for the above-described processes with the slitted roll, and also remove the slitted roll from the various devices. It is likely that operators incorrectly load or unload the slitted roll, because positions of setting the slitted roll in the devices cannot be confirmed visually due to the darkness.

In order to keep high quality of products, motion picture photo films should be sampled and checked for occurrence of defects. If sampled motion picture photo films have defects, all of portions of a master roll or film web must be traced in view of management of production, to detect particular portions from which the defects are derived.

However, there is no known technique for identification of the slitted rolls with sufficient precision for exactly finding origins of defects in continuous photo film.

SUMMARY OF THE INVENTION

In view of the foregoing problems, an object of the present invention is to provide a production managing method for photo film production in which continuous photo films are handled from one stage to another among plural stages of manufacturing processes, and each one of continuous photo films can be identified reliably without errors.

Another object of the present invention is to provide a production managing method for photo film production in which defects in continuous photo film can be readily found to keep high quality of products efficiently.

In order to achieve the above and other objects and advantages of this invention, a production managing method for photo film production includes a step of slitting film web having a great width is slitted to obtain plural continuous photo films having a small width, the film web being unwound from a master roll. Plural continuous photo film rolls are formed by winding the continuous photo films about respectively first spools, the continuous photo films being subjected in a subsequent process to treatment to obtain a photo filmstrip having a predetermined length. A first non-optical recording medium is attached to each one of the rolls, the recording medium storing information related to at least the film web, and being read in the subsequent process for use in managing the photo film production in the subsequent process.

Also, film web is slit to produce continuous photo film having a predetermined width. Production managing information is written to a non-optical recording medium, the production managing information being related to at least one of the film web and the continuous photo film. The continuous photo film is cut to produce photo film. The production managing information is stored in association with the photo film. The photo film is checked, wherein if the photo film has a defect, the production managing information is referred to for detecting a portion of the film web or the continuous photo film from which the defect derives, other photo films with a defect being traced.

Furthermore, a first roll is formed by winding the continuous photo film obtained by the slitting step. The recording medium is attached to the first roll. The continuous photo film is supplied from the first roll. The continuous photo film from the first roll is subjected to treatment. After the treatment step and before the cutting step, a second roll is formed by winding the continuous photo film. The production managing information is read from the recording medium. In the information storing step, the production managing information being read is stored in association with the second roll.

In the treatment step, the continuous photo film is perforated. In the second roll forming step, the second roll is formed by winding the continuous photo film in a direction opposite to the first roll.

The recording medium is a non-contact IC memory.

The production managing information includes slitting number information for specifying the continuous photo film.

Furthermore, in or after the cutting step, the photo film is wound about a reel, so as to obtain a photo film roll constituted by the reel and the photo film.

The photo film is motion picture photo film.

The first and second rolls are formed by winding the continuous photo film about respectively first and second spools.

The information storing step includes attaching a second non-optical recording medium to the second roll. The production managing information is written to the second recording medium.

The recording medium is attached to the first spool.

The medium attaching step is before the information writing step, the recording medium is previously attached to the first spool. The information writing step is before the continuous photo film supplying step.

Furthermore, a case sticker code is read from a container case. The photo film roll is inserted into the continuous case. The production managing information is stored in association with the case sticker code, the production managing information being read according to the case sticker code for tracing the photo film.

The production managing information further includes common information, constituted by at least one type information, lot number information, and master roll number information of the film web, and being common among plural continuous photo films obtained by the slitting step.

The non-contact IC memory is a wireless non-contact ID tag.

The recording medium is in a stick shape, disk shape or board shape.

According to a preferred embodiment, the recording medium is removable from the first spool.

Furthermore, the recording medium is removed from the first roll. The information storing step comprises attaching the recording medium to the second roll.

The information writing step is before the medium attaching step of attachment to the first roll.

According to another preferred embodiment, the recording medium has a small thickness. The first spool includes a recording medium slot, having a width corresponding to the thickness of the recording medium, for containing the recording medium removably.

According to a preferred embodiment, before the reading step, the recording medium is removed from the first roll.

The recording medium is in a sheet shape or film shape, and is attached with tacky adhesive agent to the continuous photo film, for preventing an end portion of the continuous photo film from being unwound from the first roll.

According to still another preferred embodiment, the recording medium includes a coil-shaped antenna, attached to a surface of the first spool, for sending and receiving a signal in a wireless manner. A communication IC chip has a memory and a communication circuit, the memory storing information, the communication circuit being supplied with the signal by the coil-shaped antenna for producing the information to be stored, the communication circuit reading the information from the memory for producing the signal to be sent.

BRIEF DESCRIPTION OF THE DRAWINGS

The above objects and advantages of the present invention will become more apparent from the following detailed description when read in connection with the accompanying drawings, in which:

FIG. 4 is a perspective illustrating a slitting process;

FIG. 9 is a flow chart illustrating steps included in the perforating process;

FIG. 10 is a flow chart illustrating steps included in the photo film loading process;

FIG. 21 is an explanatory view illustrating a photo film loading process in the embodiment with the sticker type of RFID tag.

DETAILED DESCRIPTION OF THE PREFERRED EMBODIMENT(S) OF THE PRESENT INVENTION

Various types of motion picture photo films are available, and include films of 8 mm, 16 mm, 35 mm and 70 mm according to the width. For any of those, the international standards according to ISO define specific values of the photo film width, a size, position and tolerable error range of a perforation, and the like. Motion picture photo films of 16 mm and 35 mm are 100, 200, 400, 1,000 or 2,000 feet long, wound in a roll form about a reel, and contained light-tightly in a metallic can having a shape of a cylinder or rectangular parallelepipedon to be shipped and sold.

Figure 1:
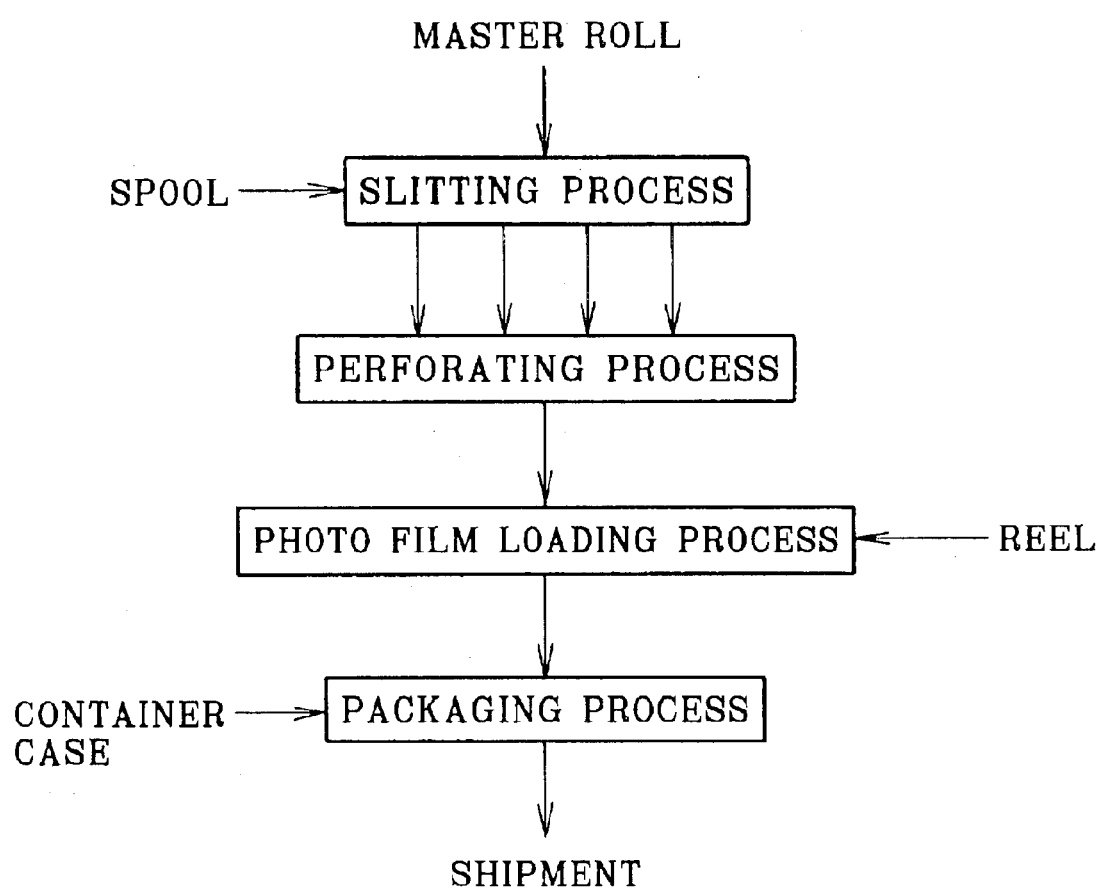
FIG. 1 is a chart illustrating processes included in a method of producing motion picture photo film.
Figure 2:
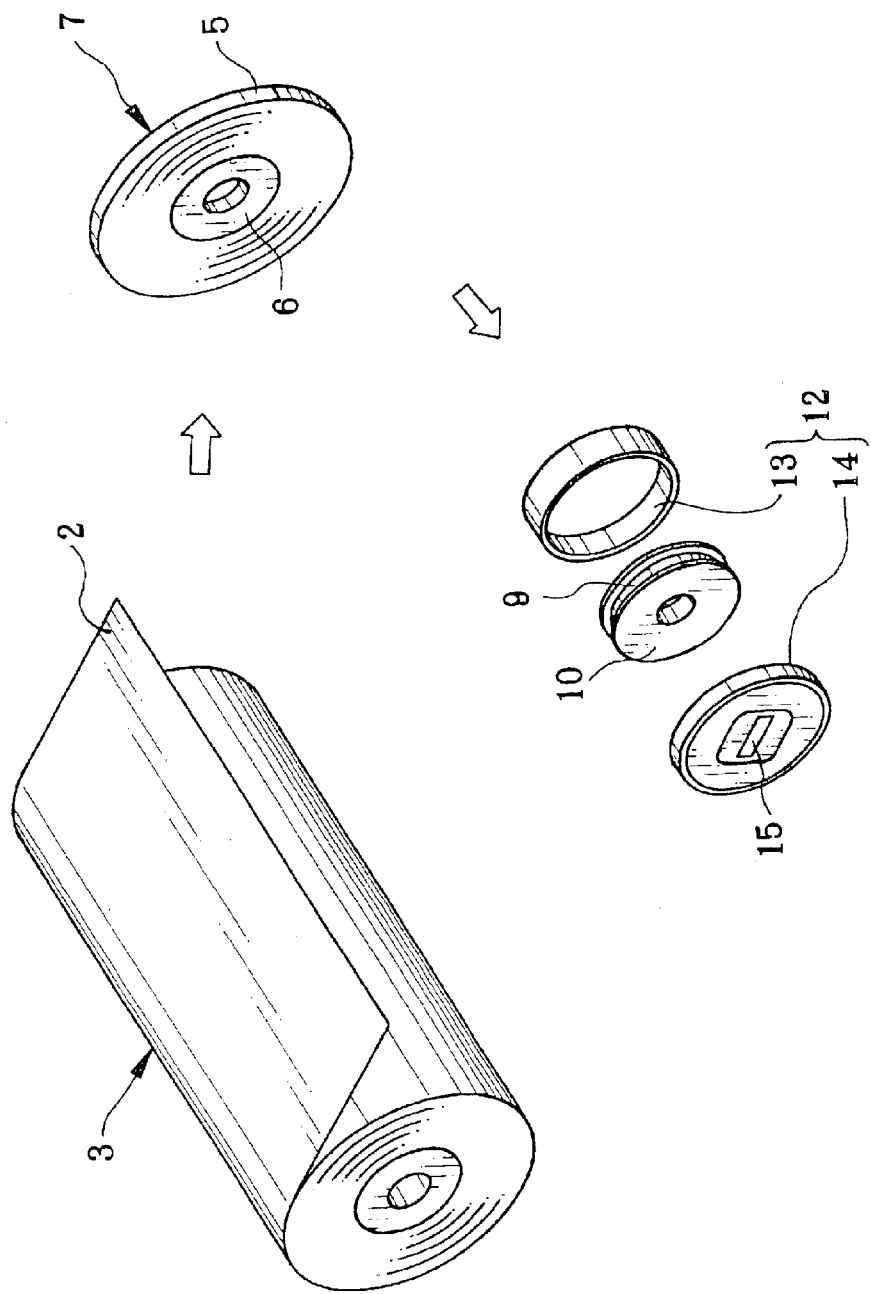
FIG. 2 is an explanatory view in perspective illustrating forms of a master roll of film web, a slitted roll of continuous photo film, and the motion picture photo film.

In FIG. 1, a line for manufacturing the motion picture photo film is illustrated. The line is constituted by components for slitting, perforating, loading and packaging. In FIG. 2, the slitting component for a slitting process is illustrated. A master roll 3 is supplied, which is a roll of film web 2 having a great width. The master roll 3 includes a support of plastic film and emulsion layers overlaid thereon. At the time of manufacturing the master roll 3, information is recorded in a form of bar code, or magnetically, to a spool or an end portion of the roll, the information including a lot number of a manufacturing lot, emulsion numbers of the emulsion layers, and the like.

The master roll 3 fed to the slitting component is slitted at the width of 35 mm for a product or motion picture photo film, to obtain continuous photo films 5 or slitted films. A first spool 6 of a disk shape takes up each of the continuous photo films 5 and winds thereabout. Thus, a first roll 7 is formed.

The perforating component forms perforations in the continuous photo film 5 unwound from the first roll 7, and operates side printing to the continuous photo film 5. After the perforating process, the first roll 7 is transferred to the photo film loading component. The continuous photo film 5 from the first roll 7 is cut at a limited great length regularly, so motion picture photo film 9 is obtained, and is wound about a reel 10.

In the packaging process, a light-tight container case 12 or can case is provided with the motion picture photo film 9. The container case 12 includes a case body 13 and a lid 14. A case sticker 15 is attached to the lid 14, and includes printed information such as a type, length, lot number of the motion picture photo film 9 in forms of letters and number as well as a bar code.

Figure 3:
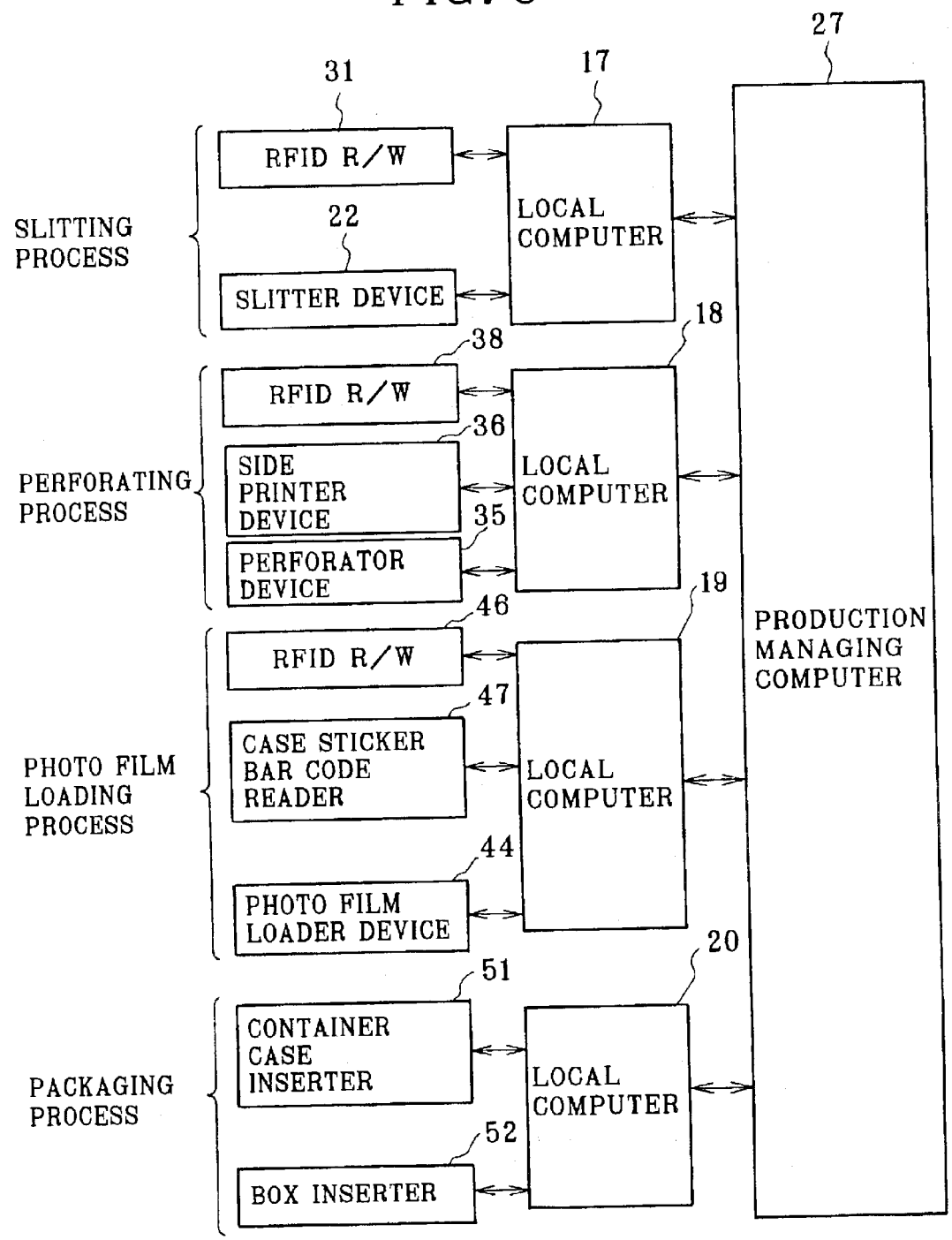
FIG. 3 is a block diagram illustrating a line for producing the motion picture photo film.

In FIG. 3, a systematic arrangement of the manufacturing line is illustrated. There are local computers 17, 18, 19 and 20 for controlling respectively the slitting, perforating, loading and packaging components. A host computer 27 for the total management of production is connected with the local computers 17–20.

In FIG. 4, there is a slitter device 22 for the slitting process to form the first roll 7. At first, the slitter device 22 is provided with the master roll 3 obtained by a preceding manufacturing line. The film web 2 is unwound from the master roll 3. Slitter blades 23 slit the film web 2 in a direction of feeding of the film web 2. The continuous photo film 5 with the width of the product is obtained.

A winder shaft 25 for rolls of odd numbers is positioned downstream from the master roll. Also, a winder shaft 26 for rolls of even numbers is positioned beside the winder shaft 25. Each of the winder shafts 25 and 26 axially supports a plurality of the first spools 6. Front end portions of the continuous photo films 5 are retained on the first spools 6 about the winder shaft 25 in row positions of Nos. 1, 3, 5, 7 and 9. When the winder shaft 25 rotates in the winding direction, the continuous photo film 5 is wound about the first spools 6. Furthermore, front end portions of the continuous photo films 5 are retained on the first spools 6 about the winder shaft 25 in row positions of Nos. 2, 4, 6, 8 and 10. The continuous photo films 5 can be wound about the first spools 6 similarly.

Figure 5A:
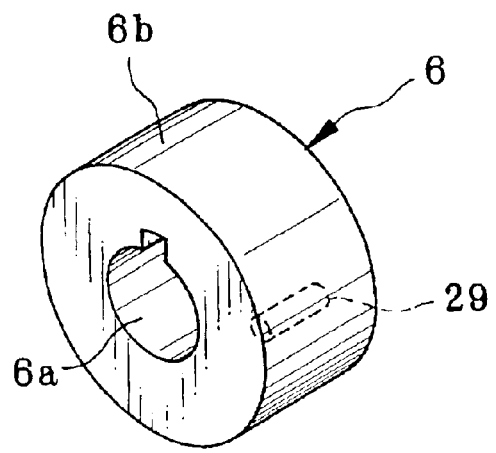
FIG. 5A is a perspective illustrating a spool in which a stick-shaped type of RFID tag is incorporated.

In FIG. 5A, the first spool 6 is formed from plastic material in a disk shape. An axial hole 6a is formed in the center of the first spool 6 for insertion of a winder shaft. A peripheral surface 6b of the first spool 6 is adapted to winding of the continuous photo film 5. An RFID (radio frequency identification) tag 29 as a wireless non-contact recording medium that is non-optical is incorporated in the first spool 6, has a stick shape, and stores information of photo film type, the lot number, the roll number, the slitting number, and the like.

Figure 5B:
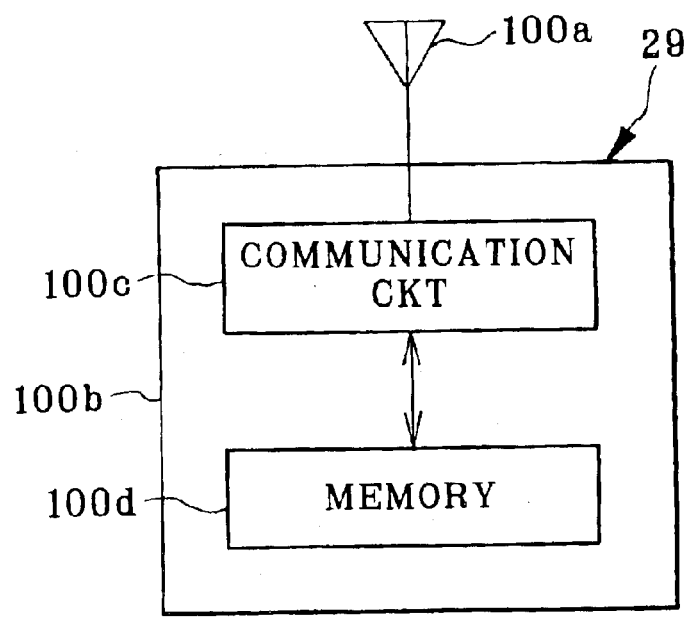
FIG. 5B is a schematic view illustrating a construction of the RFID tag.

In FIG. 5B, the RFID tag 29 includes an antenna 100a, a communication IC chip 100b and a stick-shaped case. The antenna 100a has a coil shape or thin film shape. The IC chip 100b is connected with the antenna 100a. The case contains the antenna 100a and the IC chip 100b. The antenna 100a receives radio wave from an RFID reader/writer (R/W), stores the radio wave as electric power according to electromagnetic induction, and causes the IC chip 100b to operate with energy. The IC chip 100b includes a memory 100d and a communication circuit 100c. The memory 100d stores data of various kinds. The communication circuit 100c operates for communication with the RFID reader/writer by means of the antenna 100a.

In the slitting component is disposed an RFID (radio frequency identification) reader/writer 31, which is connected with the local computer 17. A plurality of antennas 32 are connected with the RFID reader/writer 31, and send radio wave to, and receive radio wave from, the RFID tags 29. The antennas 32 are disposed respectively beside the first spools 6 which are secured to the winder shafts 25 and 26.

The RFID reader/writer 31 is controlled by the local computer 17, and records information to the RFID tag 29, the information including the photo film type, the lot number, the roll number, the slitting number and the like, according to producing planning data predetermined by the host computer.

It is to be noted that, according to the wording in the present embodiments, the roll number is a master roll number assigned uniquely to the master roll 3. The slitting number is a number assigned uniquely to the roll 7 after being slitted.

Transferring vehicles are provided in paths between the plural components, and transfer the first roll 7. Each of the vehicles has a container, which accommodates a set of the first roll 7 associated with a common roll number of the master roll 3 from which the first roll 7 are derived. As the RFID tag 29 is incorporated in the first spool 6 of the first roll 7 and has information of the slitting number, there occurs no problem even if positions of the first roll 7 change in the container.

Figure 6:
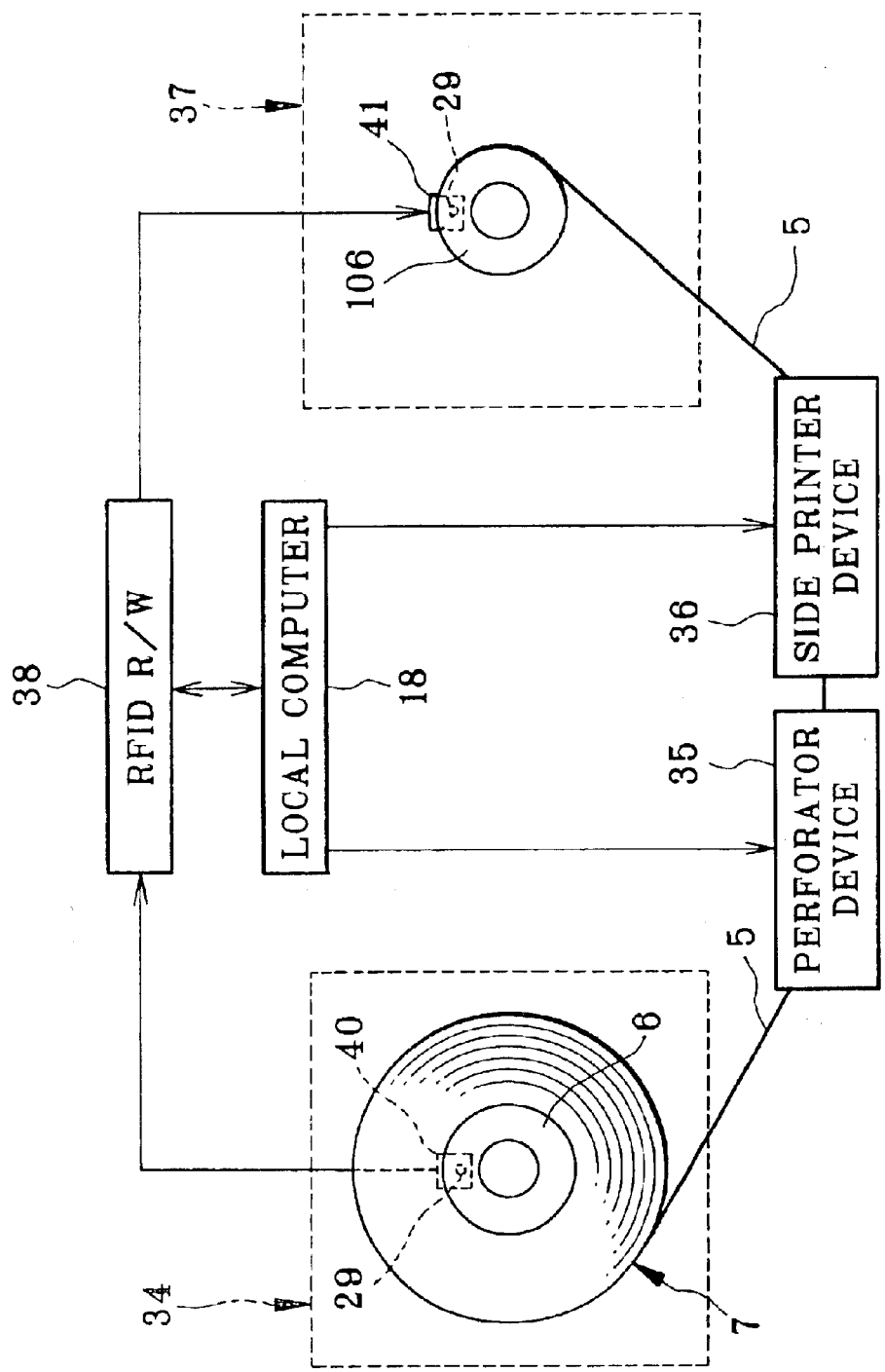
FIG. 6 is an explanatory view illustrating a perforating process.

In FIG. 6, the perforating component is illustrated, and includes a film supplier section 34, a perforator device 35, a side printer device 36, a film winder section 37, and an RFID (radio frequency identification) reader/writer 38. The film supplier section 34 is loaded with the first roll 7. The perforator device 35 forms perforations in the continuous photo film 5. The side printer device 36 prints data including the photo film type, photo film speed and the like. In the film winder section 37 is set a second spool 106, which winds the continuous photo film 5 after being worked. All of those elements are controlled by the local computer 18.

A reader antenna 40 is set at the film supplier section 34, and connected with the RFID reader/writer 38. A writer antenna 41 is set at the film winder section 37, and connected with the RFID reader/writer 38. After the first roll 7 and the second spool 106 are set in respectively the film supplier section 34 and the film winder section 37, the RFID reader/writer 38 reads data from the RFID tag 29 in the first roll 7, and writes the data to the RFID tag 29 in the second spool 106. Accordingly, the data can be stored in combination with the continuous photo film 5 even when the continuous photo film 5 becomes wound about the second spool 106 different from the first spool 6 after the perforating and side printing.

The data read by the RFID reader/writer 38 is input to the local computer 18. The local computer 18 checks the data read from the RFID tag 29, and also checks the production managing data created by the host computer 27. If there is no consistency between the data in the RFID tag 29 and the production managing data, then a warning signal is generated for informing requirement of setting the first roll 7 being suitable. Note that, new data can be written at the same time as the former data at the time of transferring data to the second spool 106.

Figure 7:
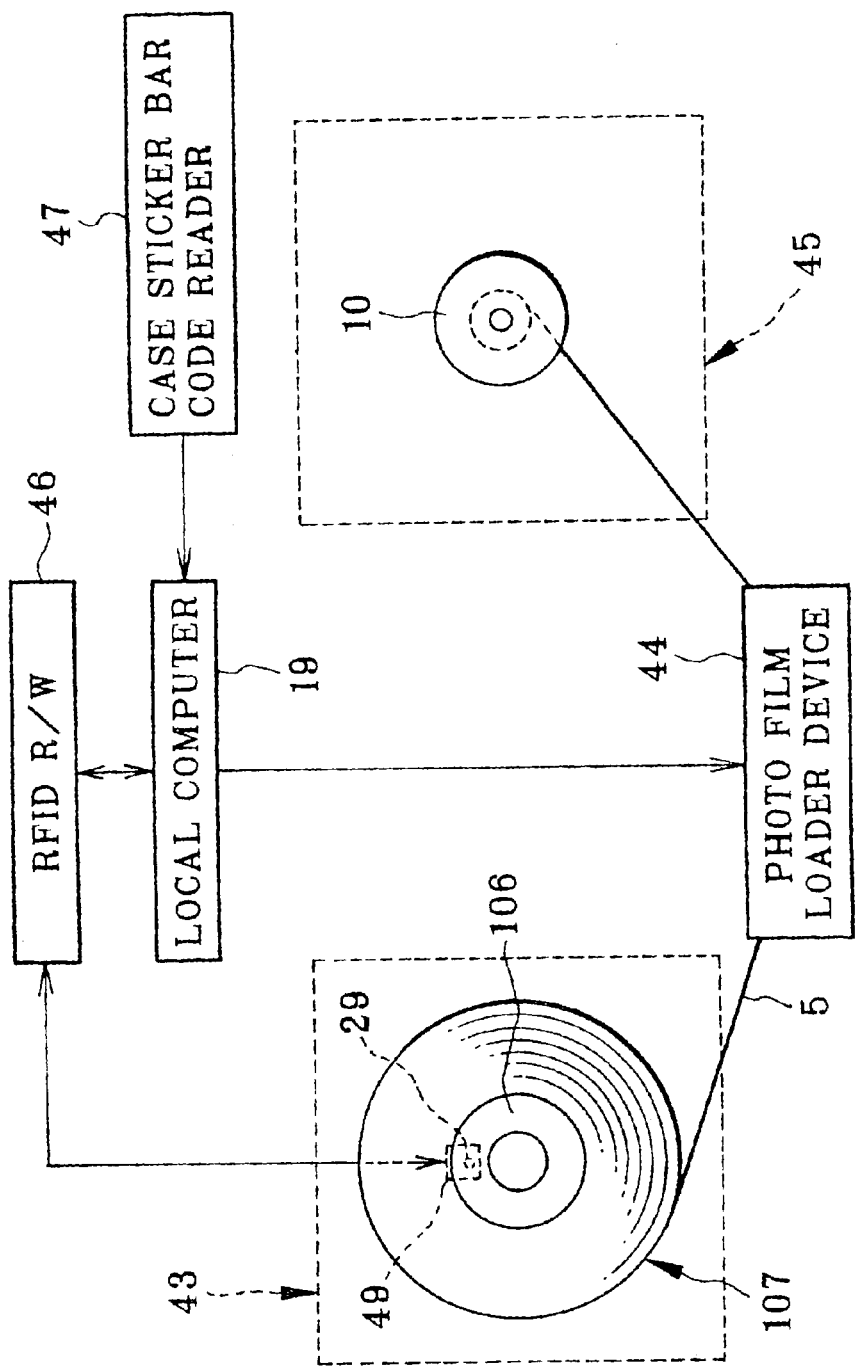
FIG. 7 is an explanatory view illustrating a photo film loading process.
Figure 8:
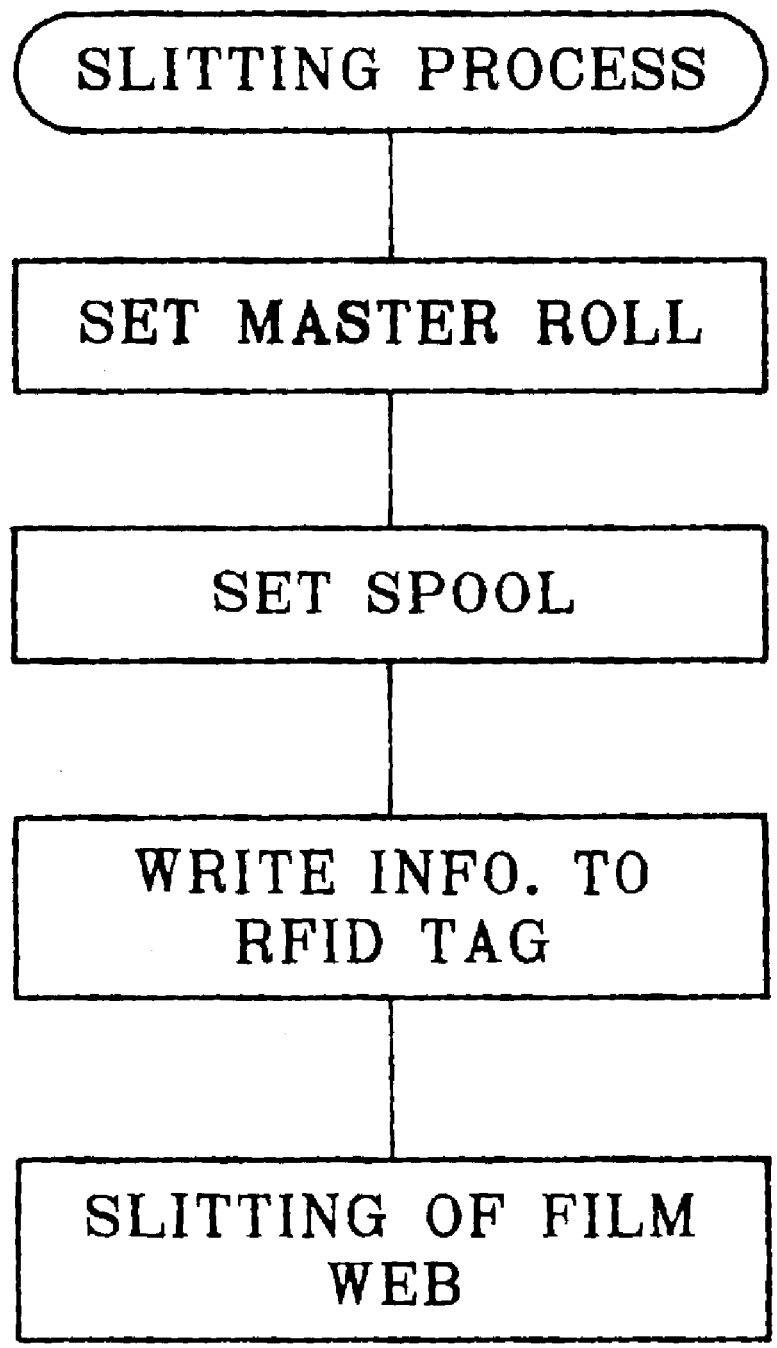
FIG. 8 is a flow chart illustrating steps included in the slitting process.
Figure 11:
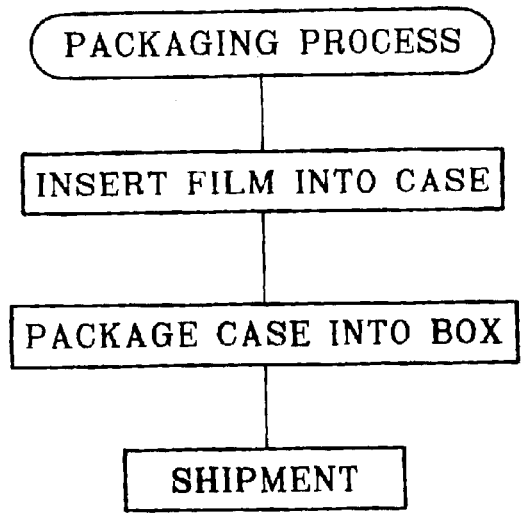
FIG. 11 is a flow chart illustrating steps included in a packaging process.

In FIG. 7, the photo film loading component for the loading process is constituted by a film supplier section 43, a photo film loader device 44 or photo film winding control device, a film winder section 45, an RFID (radio frequency identification) reader/writer 46, and a case sticker bar code reader 47. The film supplier section 43 is loaded with the first roll 7. The photo film loader device 44 measures a feeding length of the continuous photo film 5 in comparison with a cutting length, and forms the motion picture photo film 9 by cutting. The film winder section 45 is loaded with the reel 10 adapted for winding of the motion picture photo film 9. Any of those is controlled by the local computer 19.

A reader antenna 49 is set at the film supplier section 43, and connected with the RFID reader/writer 46. When a second roll 107 is set in the film supplier section 43, the RFID reader/writer 46 reads data from the RFID tag 29 in the second roll 107. The data read by the RFID reader/writer 46 is input to the local computer 19, which checks the data in comparison with the production managing data created by the host computer 27. If there is no consistency between the data in the RFID tag 29 and the production managing data, then a warning signal is generated for informing requirement of setting the second roll 107 being suitable.

The case sticker bar code reader 47 reads a bar code from the case sticker 15 on the container case 12, and sends data to the local computer 19, the bar code being preprinted on the case sticker 15 in an uniquely determined manner. The local computer 19 produces combination data of a combination of data from the RFID tag 29 with the bar code data from the case sticker 15, and inputs the combination data to the host computer 27. The host computer 27 creates a database on the basis of the input data. It is possible to discern products produced commonly from the second roll 107 by checking the bar code in the case sticker 15 at the time of random inspection or occurrence of failure.

Note that, in the loading process, information read from the RFID tag 29 for a bar code on the container case 12 may be printed on the case sticker 15, and the case sticker 15 can be attached to the container case 12. Furthermore, a bar code may be directly preprinted on a surface of the container case 12, and can be read in the loading process. Also, the bar code may be printed on a blank type of the case sticker 15 having been attached to the container case 12. Also, a two-dimensional code may be used as bar code.

The packaging component includes a container case inserter 51 and a box inserter 52. The container case inserter 51 inserts the motion picture photo film 9 into the container case 12. The box inserter 52 inserts a plurality of the container cases 12 into a cardboard box. There is a packaging ID number printed on a surface of the cardboard box. The local computer 20 reads information of the packaging ID number and the like, transfers the same to the host computer 27, which creates a database of information for the purpose of management of the information also related to a flow of products.

The operation of the above construction is described now with reference to flows in FIGS. 8–11. The slitter device 22 for the slitting process is installed in a dark room as depicted in FIG. 4, and is loaded with the master roll 3. The first spools 6 are secured to the winder shafts 25 and 26 in the slitter device 22.

When the film web 2 and the first spools 6 are set exactly, the local computer 17 generates an acoustic signal informing a ready state for slitting. After the acoustic signal is checked audibly, an operator enters a command signal to the local computer 17, and starts the slitting component.

The local computer 17 causes the RFID reader/writer 31 to operate at first. The RFID reader/writer 31 causes the antennas 32 beside the first spools 6 to transmit radio wave having a communication starting signal for communication to the RFID tag 29 that is in the first spools 6. The antenna incorporated in the RFID tag 29 receive the communication starting signal transmitted by the RFID reader/writer 31. In response, the RFID tag 29 stores power according to the electromagnetic induction, to drive the communication IC chip.

When the communication circuit in the communication IC chip is driven, the RFID reader/writer 31 sends radio wave to the RFID tag 29, the radio wave being a signal of data of the photo film type, lot number, roll number, slitting number and the like. The communication circuit in the IC chip receives data, which is written to the memory.

When data writing to the RFID tag 29 is completed, then the film web 2 is unwound from the master roll 3 in the slitter device 22. The slitter blades 23 slit the film web 2 at a width of the motion picture photo film, to form the continuous photo films 5. The films included in the continuous photo films 5 and numbered with odd numbers are wound on the first spools 6 set on the winder shaft 25. The films included in the continuous photo films 5 and numbered with even numbers are wound on the first spools 6 set on the winder shaft 26. Thus, the first roll 7 is formed.

A fastening sticker is attached to a front end portion of the continuous photo film 5, and prevents the roll from being unwound. After this, the first roll 7 is manually removed from the slitter device 22. A plurality of the first rolls 7 removed from the slitter device 22 are handled as one set according to the common roll number, and placed in the container in the transferring vehicle, and transferred from the slitting component to the perforating component. Note that the RFID tag 29 in the first spool 6 stores the information of the slitting number. Even if there occurs a change in the position of the first roll 7 in the vehicle, no problem occurs.

In the perforating process, the first roll 7 is manually removed from a transferring vehicle, and set in the film supplier section 34 depicted in FIG. 6. The second spool 106 without a roll is set in the film winder section 37. Upon the completion of setting the first roll 7 and the second spool 106, the local computer 18 generates an acoustic signal for informing readiness for the perforating operation. After the acoustic signal is heard and checked, an operator enters a command signal to the local computer 18, and starts the perforating component.

The local computer 18 drives the RFID reader/writer 38. The RFID reader/writer 38 causes the reader antenna 40 at the film supplier section 34 and the writer antenna 41 at the film winder section 37 to send radio wave that is a signal including a communication starting signal. The antenna in the RFID tag 29 in the first roll 7 receives the radio wave, stores power responsively according to the electromagnetic induction, to drive the communication IC chip. Similarly, the IC chip in the RFID tag 29 in the second spool 106 is driven.

When the communication circuit in the communication IC chip is driven, the RFID reader/writer 38 reads data from the memory in the RFID tag 29 in the roll, the data including the photo film type, the lot number, the roll number and the slitting number.

The data read from the RFID tag 29 in the first roll 7 is input to the local computer 18. The local computer 18 checks the data input by the RFID reader/writer 38, and in comparison with this, checks the production planning data created by the host computer 27. If there is no consistency after checking the data, then a warning signal is generated for informing requirement of setting the first roll 7 being suitable. If a sequence of the first roll 7 removed from the vehicle is different from the sequence according to the slitting numbers, there occurs no problem, because the slitting numbers can be found according to the data read from the RFID tag 29.

If the data read from the RFID tag 29 in the first roll 7 is detected consistent with the production planning data, then the data from the RFID tag 29 is transmitted by the writer antenna 41, and written to the memory in the RFID tag 29 in the second spool 106.

When the transfer of the data between the RFID tag 29 is completed, the continuous photo film 5 is unwound from the first roll 7. The perforator device 35 forms perforations. The side printer device 36 operates for side printing of letters, numbers and codes. After this, the continuous photo film 5 is wound about the second spool 106 in the film winder section 37, to form the second roll 107.

When the fastening sticker for preventing looseness is attached to the front end portion of the continuous photo film 5, the first roll 7 is manually removed from the film winder section 37. The plurality of the second rolls 107 from the perforating component are placed on a transferring vehicle as one set according to the same roll number of the master roll, and transferred from the perforating component to the photo film loading component.

In the photo film loading component, the second roll 107 is removed from the vehicle by a manual operation of an operator, and is set in the film supplier section 43 depicted in FIG. 7. Also, the reel 10 without a winding is set in the film winder section 45. After the second roll 107 and the reel 10 are set, the local computer 19 generates an acoustic signal to inform a ready state for the loading process. After the acoustic signal is checked and confirmed, an operator enters a command signal to the local computer 19, to drive the photo film loading component.

The local computer 19 drives the RFID reader/writer 46. The RFID reader/writer 46 causes the reader antenna 49 at the film supplier section 43 to send radio wave having a communication starting signal. The communication IC chip in the RFID tag 29 is driven. The communication circuit in the IC chip allows the RFID reader/writer 46 to read data from the memory of the RFID tag 29, the data including the photo film type, the lot number, the roll number, the slitting number and the like.

The data read from the RFID tag 29 is input to the local computer 19. The local computer 19 checks the production planning data created by the host computer 27, and in comparison with this, checks the data input by the RFID reader/writer 46. If there is no consistency, then the local computer 19 generates a warning signal for informing requirement of setting the second roll 107 being suitable.

If the data read from the RFID tag 29 is detected consistent with the production planning data, then loading of the reel 10 with the continuous photo film 5 is started. The photo film loader device 44 draws the continuous photo film 5 from the second roll 107, and causes the reel 10 to wind the continuous photo film 5 thereabout. Also, the photo film loader device 44 starts measuring a length of the continuous photo film 5 wound about the reel 10, and cuts the continuous photo film 5 when the measured length comes up to a reference length.

At the same time as the continuous photo film 5 is wound about the reel 10, the case sticker bar code reader 47 reads the bar code from the case sticker 15 on the container case 12. The data of the bar code is input to the local computer 19.

The local computer 19 creates combination data of a combination of data from the RFID tag 29 with the bar code data from the case sticker 15, and inputs the combination data to the host computer 27. The host computer 27 creates a database by means of the combination data being input. Accordingly, it is possible to discern products derived from the first roll 7 being the same according to the bar code on the case sticker 15 at the time of sampling inspection or occurrence of failure.

The reel 10 with turns of the motion picture photo film 9 having been cut from the continuous photo film 5 is removed from the film winder section 45 by a manual operation of an operator. The plurality of the reels 10 from the photo film loading component are contained together in a transferring vehicle as one set associated with the same roll number of the master roll, and is transferred from the photo film loading component to the packaging component.

In the packaging component, the container case inserter 51 inserts the reel 10 with the motion picture photo film 9 into the case body 13. The lid 14 is fitted on the case body 13, to close and seal the container case 12 tightly. Then the box inserter 52 inserts a plurality of the container cases 12 into cardboard boxes. The boxes are shipped after packaging the container case 12.

In the above embodiment, the number of the antennas used in the slitting process is ten, and the same as that of the first spools 6. However, antennas used in the slitting process can have a considerably high sensitivity, so that the number of the antennas may be smaller than the number of the first spools 6. Furthermore, an RFID reader/writer may be a type that can be handled manually with ease by an operator so as to send data to and receive data from the first spool 6, 106.

In the above embodiment, the writing to the RFID tag 29 is before slitting in the slitting component. However, it is possible to write data for two times, namely before and after setting the first spool 6 to the slitter device 22. At the first time of writing, the photo film type, the lot number and the roll number may be written. At the second time of writing, the slitting number may be written. The plural first spools 6 can be set into the slitter device 22 even without considering the sequence of the first spools 6. After the slitting, the first rolls 7 are handled according to the same roll number of the master roll. It is possible to indicate the roll number only at end rolls included in the first rolls 7 and disposed at two ends.

Figure 12:
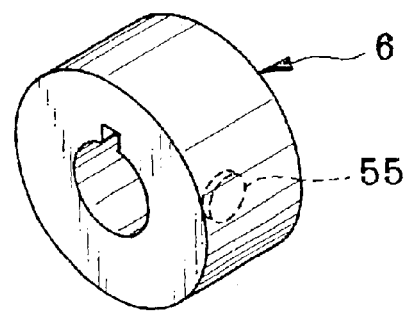
FIG. 12 is a perspective illustrating another preferred spool having a disk-shaped type of RFID tag.
Figure 13:
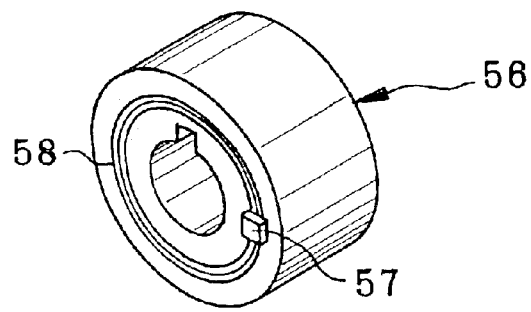
FIG. 13 is a perspective illustrating still another preferred spool having a coil-shaped antenna.

In the above embodiment, the RFID tag 29 has a stick shape. Alternatively, an RFID (radio frequency identification) tag 55 in a coin-shape may be used as a recording medium. See FIG. 12. Furthermore, FIG. 13 illustrates another preferred spool 56 including an RFID tag. A coil-shaped antenna 58 is secured to an end face of the spool 56. A communication IC chip 57 is connected with the coil-shaped antenna 58, and includes a communication circuit and a memory.

Figure 14A:
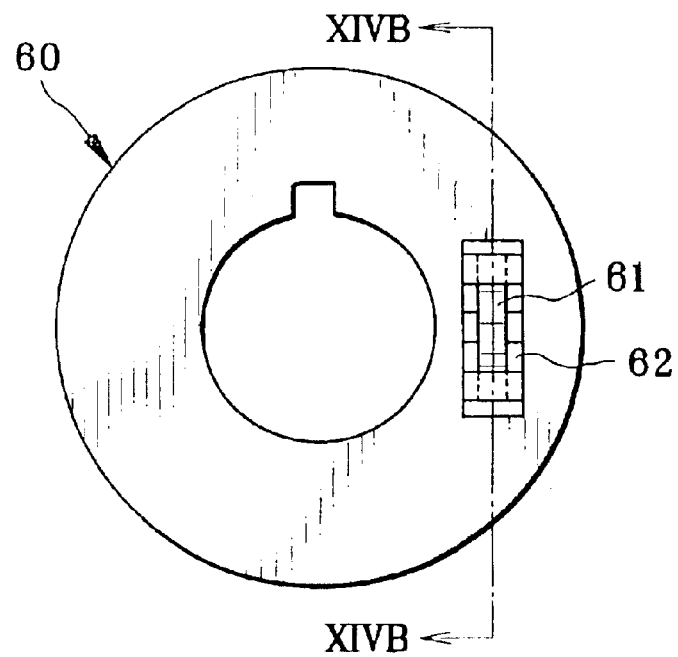
FIG. 14A is a front elevation illustrating a preferred spool in which a disk-shaped type of RFID tag is removably disposed.
Figure 14B:
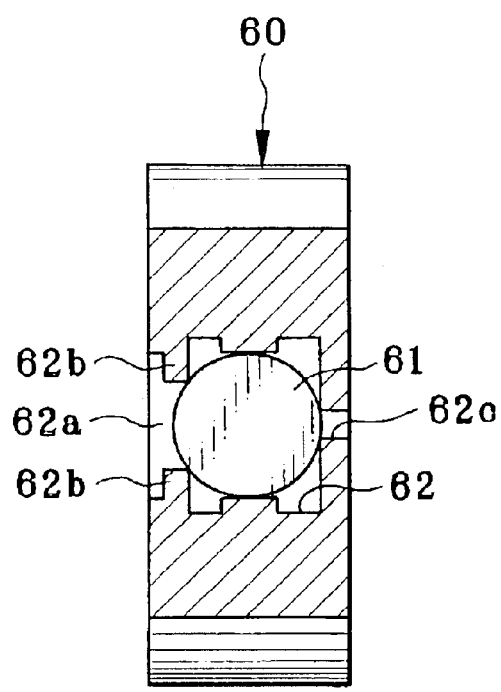
FIG. 14B is a vertical section illustrating the spool of FIG. 14A.

In FIGS. 14A and 14B, another preferred spool 60 is illustrated as either first or second spool. FIG. 14B is a section taken on line XIVB—XIVB in FIG. 14A. A tag container 62 is formed in the spool 60. A coin-shaped RFID (radio frequency identification) tag 61 as a disk-shaped recording medium is contained in the tag container 62. A recording medium slot 62a is open in the tag container 62. The coin-shaped RFID tag 61 is pressed into the recording medium slot 62a so that the coin-shaped RFID tag 61 can be contained in the tag container 62. Stoppers 62b are deformed resiliently in the tag container 62, to keep the coin-shaped RFID tag 61 positioned fixedly. If an operator intends to remove the coin-shaped RFID tag 61 from the tag container 62, a tool is inserted through a hole 62c positioned opposite to the recording medium slot 62a, to push out the coin-shaped RFID tag 61 from the tag container 62.

Figure 15A:
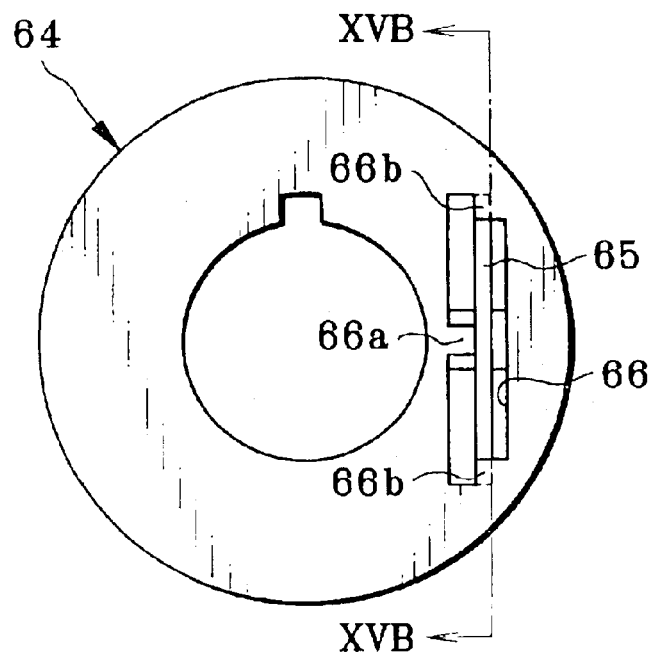
FIG. 15A is a front elevation illustrating a preferred spool in which a board-shaped type of RFID tag is removably disposed.
Figure 15B:
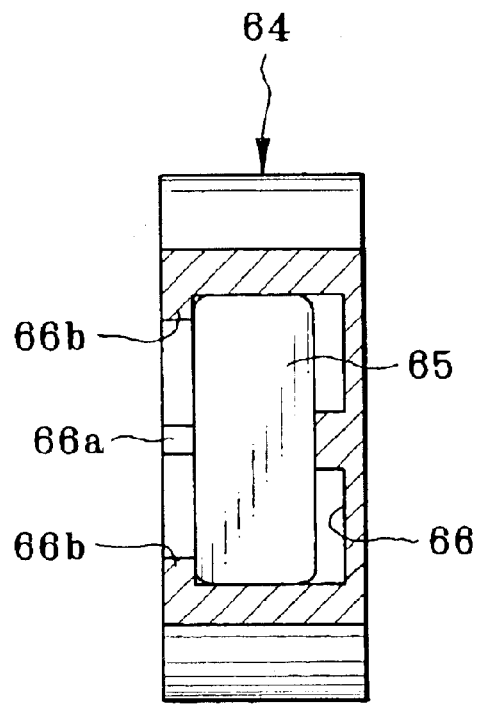
FIG. 15B is a vertical section illustrating the spool of FIG. 15A.
Figure 16:
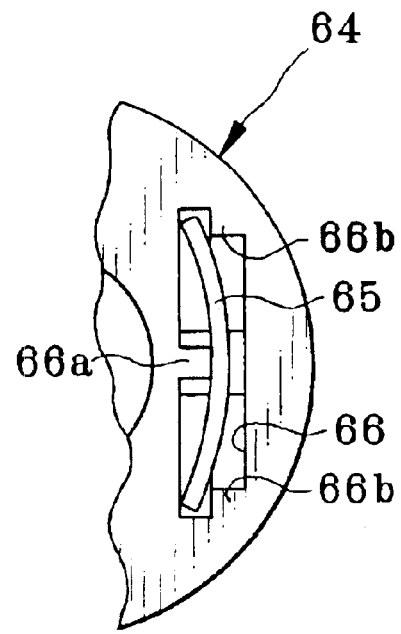
FIG. 16 is a front elevation, partially cutaway, illustrating the same as FIG. 15B but in which the RFID tag is deformed for loading and unloading.

In FIGS. 15A and 15B, another preferred spool 64 is illustrated as either first or second spool. FIG. 15B is a section taken on line XVB—XVB in FIG. 15A. A recording medium slot 66 of a tag container is formed in the spool 64. A board-shaped RFID (radio frequency identification) tag 65 is contained in the tag container 62. In FIG. 16 are depicted a ridge 66a and a stopper 66b disposed in the recording medium slot 66. For insertion and removal of the board-shaped RFID tag 65, a central portion of the board-shaped RFID tag 65 is pressed against the ridge 66a to flex the board-shaped RFID tag 65. Ends of the board-shaped RFID tag 65 are placed away from the stopper 66b of the recording medium slot 66, to facilitate movement of the board-shaped RFID tag 65 into and out of the recording medium slot 66.

Note that it is further possible to write predetermined data to the RFID tag 61, 65 initially, and to secure the RFID tag 61, 65 to the spool 60, 64 shortly before or at the same time as the slitting process. Also in the perforating component, the RFID tag 61, 65 may be removed from the spool 60, 64 at the time of rewinding to a second spool, and then may be secure to the second spool.

Figure 17:
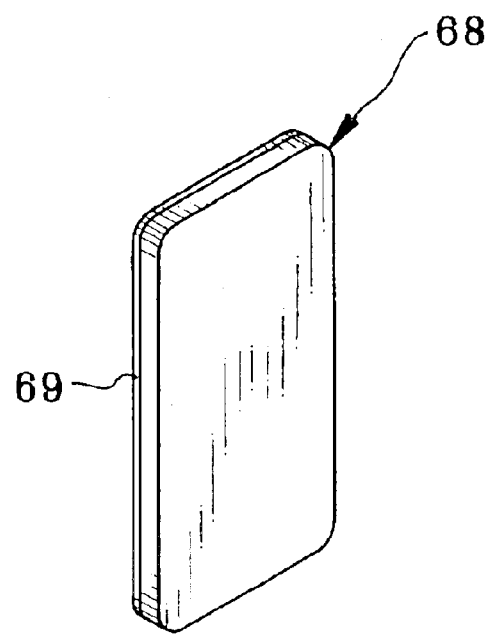
FIG. 17 is a perspective illustrating a sticker type of RFID tag.
Figure 18:
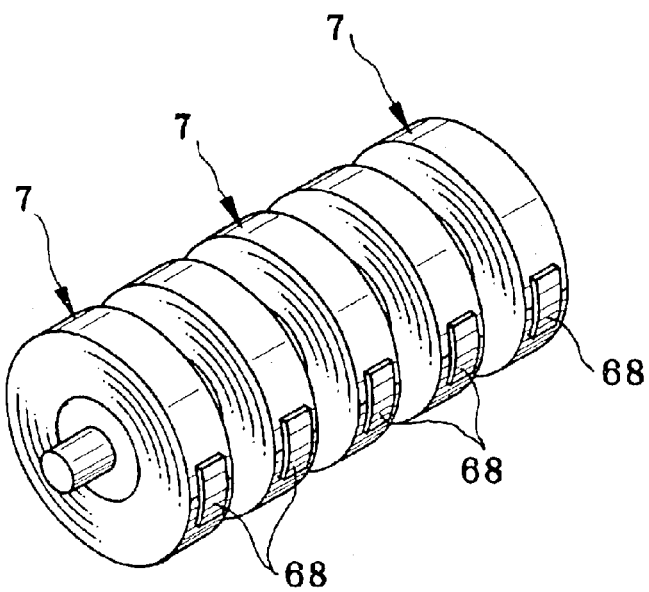
FIG. 18 is a perspective illustrating slitted rolls with the RFID tags attached thereto.

In any of the above embodiments, the RFID tag is fastened to the spool. However, a sticker-shaped RFID (radio frequency identification) tag 68 may be attached to the roll or slitted film. See FIG. 17. The sticker-shaped RFID tag 68 has a base sheet and a layer of tacky adhesive agent 69 overlaid thereon. In FIG. 18, the sticker-shaped RFID tag 68 is attached in manner to operate also as the fastening sticker, which is attached to the front end of the continuous photo film 5 and the periphery of the first roll 7 to prevent looseness.

Figure 19:
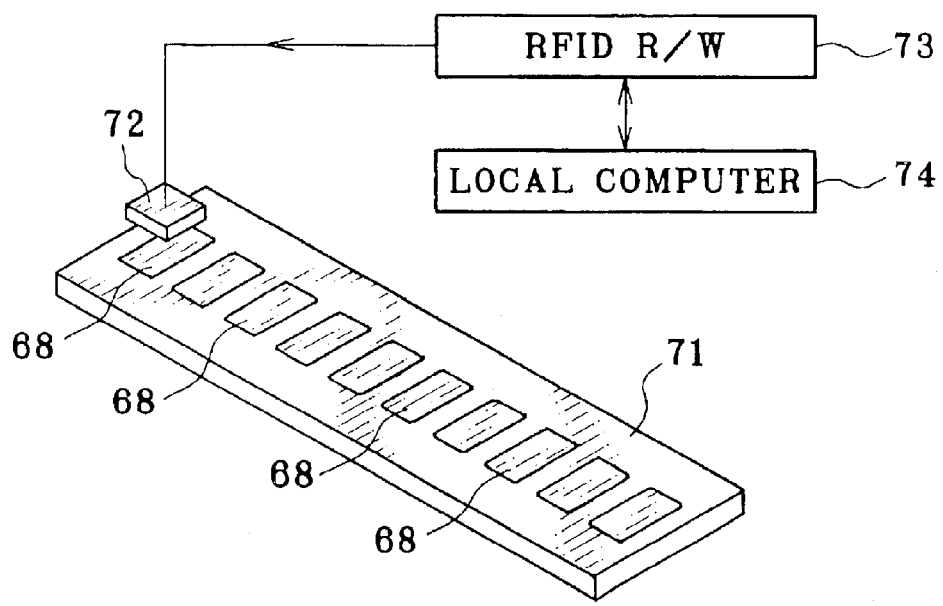
FIG. 19 is a perspective illustrating a process of writing information.

When the sticker-shaped RFID tag 68 is used, a process of writing data is added before the process of the slitting component. Data is previously written to the sticker-shaped RFID tag 68 before the continuous photo film 5 is supplied to the slitting component. In FIG. 19, a flat support tool 71 is used in the data writing process. A plurality of the sticker-shaped RFID tags 68 are placed on the flat support tool 71. An antenna 72 is disposed movably relative to the flat support tool 71. An RFID (radio frequency identification) reader/writer 73 causes the antenna 72 to sends radio wave to write the data to the sticker-shaped RFID tag 68. Note that a local computer 74 is connected with a host computer for management, and controls the RFID reader/writer 73.

In the slitting process, the sticker-shaped RFID tag 68 is attached to extend on the front end portion of the continuous photo film 5 and the periphery of the first roll 7 in a position downstream from the slitter device.

The first roll 7 with the sticker-shaped RFID tag 68 attached thereto is removed manually from the slitter device. The plurality of the first rolls 7 from the slitter device are contained together in a containing transferring vehicle downstream from the slitting component as one set associated with the same roll number of the master roll, and is transferred to the perforating component. It is necessary to confirm the direction of containing the first roll 7 for preventing looseness and damages of the first roll 7 upon occurrence of the sticker-shaped RFID tag 68 in the vehicle.

Figure 20:
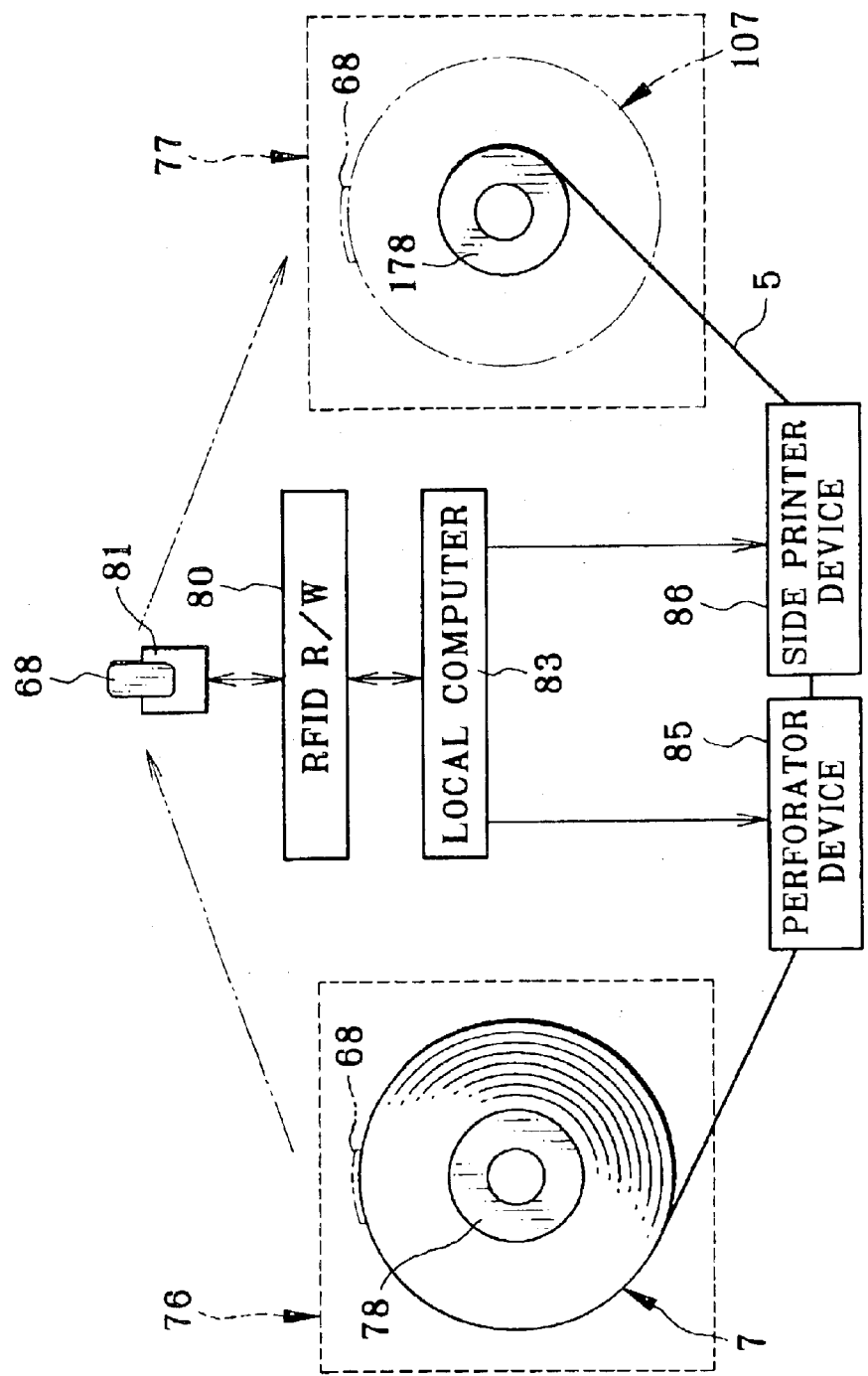
FIG. 20 is a perspective illustrating a perforating process in the embodiment with the sticker type of RFID tag.

In FIG. 20, the perforating process is depicted. The first roll 7 is removed from the vehicle by a manual operation of an operator. The first roll 7, which is formed about a first spool 78, is set in a film supplier section 76. Also, a second spool 178 is set in a film winder section 77. The sticker-shaped RFID tag 68 is peeled from the first roll 7 set in the film supplier section 76. An RFID (radio frequency identification) reader/writer 80 is connected with an antenna 81. The sticker-shaped RFID tag 68 is moved into a domain where the antenna 81 is sensitive.

A local computer 83 controls the RFID reader/writer 80. The antenna 81 generates radio wave having a communication starting signal. The sticker-shaped RFID tag 68 has the antenna which receives the communication starting signal, so that power is stored by electromagnetic induction, to operate the communication IC chip. In response to start of the operation of the communication circuit, the RFID reader/writer 80 reads data from the memory in the sticker-shaped RFID tag 68, the data including the photo film type, the lot number, the roll number and the slitting number.

The data read from the sticker-shaped RFID tag 68 is input to the local computer 83. The local computer 83 checks the production planning data created by the host computer 27, and in comparison with this, checks the data input by the RFID reader/writer 80. If there is no consistency after checking the data, then a warning signal is generated for informing requirement of setting the first roll 7 being suitable.

The first roll 7 of which the sticker-shaped RFID tag 68 has been removed is unwound by drawing the continuous photo film 5. A perforator device 85 forms perforations in the continuous photo film 5. A side printer device 86 prints numbers, letters, signs and the like to the continuous photo film 5. After this, the continuous photo film 5 is wound about the second spool 178 at the film winder section 77, to form the second roll 107.

The sticker-shaped RFID tag 68 removed from the first roll 7 set in the film supplier section 76 is attached to the periphery of the second roll 107 newly formed in the film winder section 77. The second roll 107 with the sticker-shaped RFID tag 68 is unloaded from the film winder section 77 by a manual operation of an operator. A plurality of the second rolls 107 having been treated in the perforating process are handled as one set according to the common roll number, and placed in the container in the transferring vehicle, and transferred from the perforating component to the photo film loading component.

In the loading process, an operator removes the second roll 107 from the transferring vehicle. In FIG. 21, a film supplier section 88 receives the second roll 107 set therein. A film winder section 89 is provided with the reel 10 without a photo film. When setting of the second roll 107 and the reel 10 is completed, the sticker-shaped RFID tag 68 is peeled from the second roll 107 set in the film supplier section 88. There are an RFID (radio frequency identification) reader/writer 90 and an antenna 91 connected therewith. The sticker-shaped RFID tag 68 is moved into a region where the antenna 91 can receive radio wave.

A local computer 93 controls the RFID reader/writer 90, which causes the antenna 91 to send radio wave of a signal including a communication starting signal. The communication IC chip in the sticker-shaped RFID tag 68 is driven. The RFID reader/writer 90 reads data from the memory of the sticker-shaped RFID tag 68, the data including the photo film type, lot number, roll number, slitting number and the like.

The data read from the sticker-shaped RFID tag 68 is input to the local computer 93. The local computer 93 checks data input by the RFID reader/writer 90 in comparison with the production planning data created by the host computer 27. If no consistency is detected according to a result of the checking, then a warning signal is generated for informing requirement of setting the second roll 107 being suitable.

If consistency is detected between the data read from the sticker-shaped RFID tag 68 and the production planning data, then a photo film loader device 95 or photo film winding control device starts loading the reel 10 with the continuous photo film 5. At the same time as this, a case sticker bar code reader 96 reads the bar code in the case sticker 15 on the container case 12.

The reel 10 with the motion picture photo film 9 wound thereon is transferred to the packaging component for the packaging process. The photo film rolls with the reels 10 are inserted into the container case 12. A number of container cases 12 are inserted into cardboard boxes, and shipped. The sticker-shaped RFID tag 68 peeled from the second roll 107 is transferred to the component for the data writing process, and is reused.

In the above embodiments, the roll is supplied to the slitting component after writing the data to the RFID tag. However, an RFID tag without data may be supplied to the slitting component. The data can be written to the RFID tag after being attached to the roll.

In the above embodiments, the RFID (radio frequency identification) tag is used as a wireless non-contact recording medium. Furthermore, other recording mediums may be used, for example, a recording medium of a type for use with the close magnetic field. The memory incorporated in the RFID tag may be any suitable type, for example a type in which data can be written and also rewritten by replacement of former data, and a type in which data can be additionally written but without possibility of deletion.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A production managing method for photo film production, comprising steps of:
   slitting film web having a great width to obtain plural continuous photo films having a small width, said film web being unwound from a master roll;
   forming plural continuous photo film rolls by winding said continuous photo films about respectively first spools, said continuous photo films being subjected in a subsequent process to treatment to obtain a photo filmstrip having a predetermined length; and
   attaching a first non-optical recording medium to each one of said rolls, said recording medium storing information related to at least said film web, and being read in said subsequent process for use in managing said photo film production in said subsequent process,
   wherein said information includes an identification number and type information of said continuous photo films,
   wherein said subsequent process includes steps of:
      drawing a continuous photo film from said one roll;
      perforating said continuous photo film; and
      forming a perforated continuous photo film roll by winding said continuous photo film about a second spool, to obtain a perforated roll, and
   wherein said information read from said first recording medium is written to a second recording medium attached to said second spool, said continuous photo film being wound about said second spool.

2. A production managing method as defined in claim 1, wherein said information further includes a lot number information, master roll information of said master roll, and defect information, said defect information is adapted for specifying other continuous photo films in estimation of being similarly defective by referring to said lot number information and said master roll information.

3. A production managing method as defined in claim 1, wherein said first recording medium is attached to said one roll after said information is written thereto.

4. A production managing method as defined in claim 1, wherein said information is written to said first recording medium after being attached to said one roll.

5. A production managing method as defined in claim 1, wherein said first recording medium is attached to each of said first spools.

6. A production managing method as defined in claim 5, wherein said first recording medium is removable from each of said first spools.

7. A production managing method as defined in claim 1, wherein said first recording medium comprises a fastening sticker attached to an end portion of each of said continuous photo films for preventing said rolls from being loose.

8. A production managing method as defined in claim 1, wherein said first and second recording media are non-contact IC memories.

9. A production managing method as defined in claim 1, wherein said first and second recording media are wireless non-contact ID tags.

10. A production managing method for photo film production, comprising steps of:
    slitting film web having a great width to obtain plural continuous photo films having a small width, said film web being unwound from a master roll;
    forming plural continuous photo film rolls by winding said continuous photo films about respectively first spools, said continuous photo films being subjected in a subsequent process to treatment to obtain a photo filmstrip having a predetermined length; and
    attaching a first non-optical recording medium to each one of said rolls, said recording medium storing information related to at least said film web, and being read in said subsequent process for use in managing said photo film production in said subsequent process,
    wherein said information includes an identification number and type information of said continuous photo films,
    wherein said subsequent process includes steps of:
       drawing a continuous photo film from said one roll;
       perforating said continuous photo film; and
       forming a perforated continuous photo film roll by winding said continuous photo film about a second spool, to obtain a perforated roll, and
    wherein said first recording medium is removed from said one roll, and attached to said perforated roll.

11. A production managing method as defined in claim 10, wherein said information further includes a lot number information, master roll information of said master roll, and defect information, said defect information is adapted for specifying other continuous photo films in estimation of being similarly defective by referring to said lot number information and said master roll information.

12. A production managing method as defined in claim 10, wherein said first recording medium is attached to said one roll after said information is written thereto.

13. A production managing method as defined in claim 10, wherein said information is written to said first recording medium after being attached to said one roll.

14. A production managing method as defined in claim 10, wherein said first recording medium is attached to each of said first spools.

15. A production managing method as defined in claim 14, wherein said first recording medium is removable from each of said first spools.

16. A production managing method as defined in claim 10, wherein said first recording medium comprises a fastening sticker attached to an end portion of each of said continuous photo films for preventing said rolls from being loose.

17. A production managing method as defined in claim 10, wherein said first and second recording media are non-contact IC memories.

18. A production managing method as defined in claim 10, wherein said first and second recording media are wireless non-contact ID tags.

* * * * *